(12) United States Patent
Stegmaier et al.

(10) Patent No.: US 8,950,184 B2
(45) Date of Patent: Feb. 10, 2015

(54) DEVICE FOR UTILIZING WASTE HEAT

(75) Inventors: Juergen Stegmaier, Ludwigsburg (DE);
Martin Cichon, Stuttgart (DE);
Manfred Schmitt, Heppenheim (DE);
Achim Schmidt, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 13/390,082

(22) PCT Filed: Jun. 22, 2010

(86) PCT No.: PCT/EP2010/058774
§ 371 (c)(1),
(2), (4) Date: Apr. 24, 2012

(87) PCT Pub. No.: WO2011/018263
PCT Pub. Date: Feb. 17, 2011

(65) Prior Publication Data
US 2012/0198840 A1 Aug. 9, 2012

(30) Foreign Application Priority Data

Aug. 12, 2009 (DE) .......................... 10 2009 028 467

(51) Int. Cl.
*F02G 3/00* (2006.01)
*F01K 23/10* (2006.01)
*F01P 1/06* (2006.01)
*F01P 11/08* (2006.01)
(Continued)

(52) U.S. Cl.
CPC ................. *F02B 33/34* (2013.01); *F01K 9/003* (2013.01); *F01K 23/065* (2013.01); *F01N 5/02* (2013.01); *F02B 39/08* (2013.01); *F02G 5/02* (2013.01); *F01P 2005/105* (2013.01); *F01P 2060/08* (2013.01); *Y02T 10/16* (2013.01); *Y02T 10/166* (2013.01)
USPC .......... 60/616; 60/618; 123/41.31; 123/41.33

(58) Field of Classification Search
USPC ................. 60/616, 618, 597–598; 123/41.31, 123/41.33
See application file for complete search history.

(56) References Cited

U.S. PATENT DOCUMENTS

| 4,003,204 A | * | 1/1977 | Bradley | .......................... 60/618 |
| 4,003,344 A | * | 1/1977 | Bradley | .......................... 60/618 |

(Continued)

FOREIGN PATENT DOCUMENTS

| DE | 96 753 | 4/1973 |
| DE | 10 2006 057247 | 6/2008 |

(Continued)

OTHER PUBLICATIONS

Machine translation of DE102006057247A1 (published on Sep. 19, 2009) obtained from Espacenet on Jan. 9, 2014 attached.*

(Continued)

*Primary Examiner* — Thomas Denion
*Assistant Examiner* — Ngoc T Nguyen
(74) *Attorney, Agent, or Firm* — Kenyon & Kenyon LLP

(57) ABSTRACT

A device for utilizing waste heat of an internal combustion engine. A heat exchanger of a circuit of a working medium is provided in its exhaust system. A pump is connected upstream from the heat exchanger, the circuit containing an expansion machine. A coupling heat exchanger is located in the circuit of the working medium, the working medium of the circuit and the cooling medium of the internal combustion engine flowing through the coupling heat exchanger.

7 Claims, 1 Drawing Sheet

(51) Int. Cl.
*F02B 33/34* (2006.01)
*F01K 9/00* (2006.01)
*F01K 23/06* (2006.01)
*F01N 5/02* (2006.01)
*F02B 39/08* (2006.01)
*F02G 5/02* (2006.01)
*F01P 5/10* (2006.01)

(56) References Cited

U.S. PATENT DOCUMENTS

| | | | |
|---|---|---|---|
| 4,003,345 A * | 1/1977 | Bradley | 60/618 |
| 8,407,999 B2 * | 4/2013 | Gray, Jr. | 60/618 |
| 2010/0101224 A1 * | 4/2010 | Kasuya et al. | 60/597 |
| 2010/0192569 A1 * | 8/2010 | Ambros et al. | 60/602 |
| 2013/0068202 A1 * | 3/2013 | Kardos et al. | 123/563 |
| 2013/0111932 A1 * | 5/2013 | Mishima | 62/79 |

FOREIGN PATENT DOCUMENTS

| | | | |
|---|---|---|---|
| EP | 0 060 159 A1 * | 6/1985 | |
| EP | 0 645 272 | 3/1995 | |
| FR | 2 510 183 | 1/1983 | |
| JP | 56-54926 | 5/1981 | |
| JP | 09096471 A * | 4/1997 | F25B 27/02 |
| JP | 2005-282363 | 10/2005 | |
| JP | 2009-167994 | 7/2009 | |
| WO | WO 2008/068060 | 6/2008 | |
| WO | WO 2008126723 A1 * | 10/2008 | |

OTHER PUBLICATIONS

BMW four-cylinder uses waste heat for increased performance—engine with turbine; Auto Motor and Sport, vol. 10, p. 26/2005.

* cited by examiner

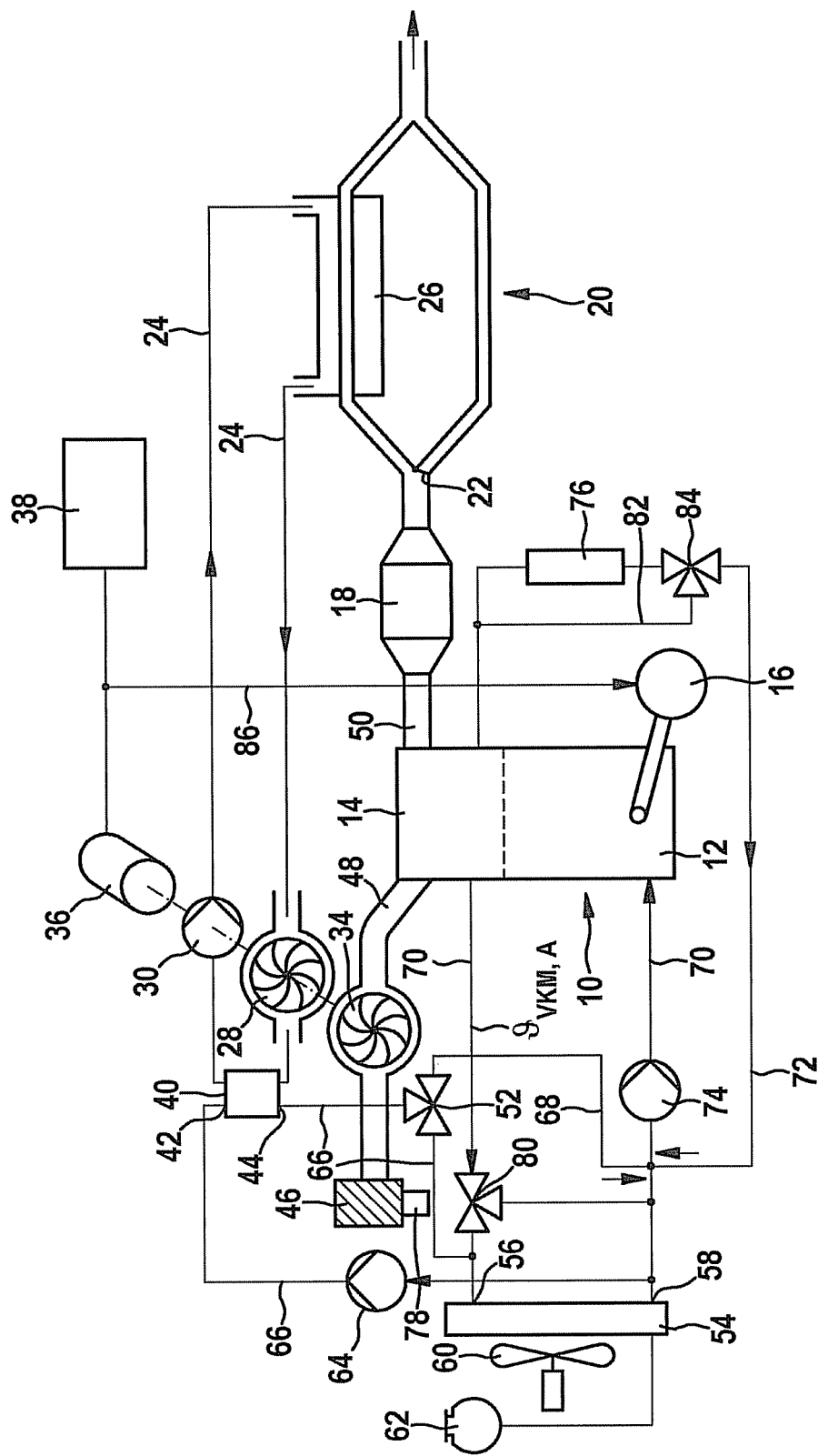

DEVICE FOR UTILIZING WASTE HEAT

BACKGROUND INFORMATION

German Patent No. DE 10 2006 057 247 relates to a supercharging device in which thermal energy is withdrawn from the exhaust gas of an internal combustion engine via a steam circuit and converted partially into mechanical and electrical energy by a turbine. Unutilized waste heat is discharged to the environment by a separate condenser. A supercharging device is used in particular for supercharging an internal combustion engine. At least one exhaust gas heat exchanger of a circuit of a working medium is situated in the exhaust system. A delivery unit is connected in the circuit of the working medium upstream from the at least one exhaust gas heat exchanger. The circuit of the working medium contains at least one turbine part, via which at least one compressor part situated in the intake system of the internal combustion engine is driven.

A publication "BMW four-cylinder utilizes waste heat for increased performance-engine with turbine" is known from the magazine "Auto Motor und Sport," volume 10, page 26/2005. According to this publication, an internal combustion engine converts approximately two-thirds of the energy contained in the fuel into waste heat, which is either taken up into the cooling system of the internal combustion engine or discharged through the exhaust system of the internal combustion engine. In internal combustion engines, the previously unutilized waste heat may be used for increasing the efficiency by up to 15%. To that end, a 1.8-liter four-cylinder engine is coupled to a steam turbine having a two-stage design which acts on the crank shaft of the 1.8-liter four-cylinder engine. The hot steam is generated by heat exchangers which are accommodated close to the exhaust pipe in the exhaust system of the internal combustion engine. A water circuit may be used to branch cooling fluid off from the cooling circuit of the internal combustion engine. The drive of the crank shaft makes it possible to either increase the power and the torque or reduce the specific fuel consumption significantly.

SUMMARY OF THE INVENTION

According to the present invention, it is provided in the case of the device for utilizing waste heat, in particular the waste heat of an internal combustion engine, to pick off the flow to a coupling heat exchanger at the radiator outlet of the radiator of the internal combustion engine. The return flow of the coupling heat exchanger is fed into a first circuit in the warm-up phase of the internal combustion engine for shortening this warm-up phase. At the operating temperature, in contrast, the return flow of the coupling heat exchanger is fed into a heating circuit of the internal combustion engine upstream from the main radiator.

The following advantages are obtained:

At the operating temperature of the internal combustion engine, this approach results in the lowest available temperature level in the coupling heat exchanger (condenser) of the steam circuit. The utilization of the waste heat of the internal combustion engine may be used for shortening the warm-up phase of the internal combustion engine. Furthermore, the possibility exists for utilizing the waste heat of the internal combustion engine for heating the interior of the vehicle, which takes place in particular at a low engine load. Furthermore, it is possible to reduce the cooling of the internal combustion engine. The temperature regulation of the internal combustion engine is also not falsified when a conventional expansion material thermostat is used. Furthermore, the approach according to the present invention is characterized in that no additional radiator is needed for a low-temperature cooling circuit. It would be possible to implement this using a separate cooling circuit for the coupling heat exchanger (condenser), which may, however, be dispensed with, resulting in a saving of weight and installation space. Furthermore, negative effects on the drag coefficient, which could otherwise occur, are avoided.

According to the approach according to the present invention, the waste heat of the steam circuit is coupled into a first circuit of the engine cooling system via a coupling heat exchanger during the warm-up phase of the internal combustion engine for warm-up acceleration, in order to minimize the fuel consumption of the internal combustion engine. The coupling heat exchanger is in particular a condenser through which a cooling fluid of the internal combustion engine flows. After the warm-up phase of the internal combustion engine is concluded, the return flow of the condenser is fed by an additional valve upstream from the radiator inlet in order to increase the power in the steam circuit which is also guided through the coupling heat exchanger. If engine outlet temperature $\vartheta_{VKM,A}$ drops below a predefinable setpoint temperature during operation, switching valve U is again switched back to the first circuit in order to utilize the waste heat of the steam circuit for heating the interior of the motor vehicle or for preventing the internal combustion engine from cooling down. Both a thermostatic valve and a condenser valve are in this case controlled by the temperature of the internal combustion engine. For simplifying the approach, both valves, i.e., the thermostatic valve and the condenser valve, may be adjusted at the same temperature, and in a further possible simplification, the adjustment of both valves may be performed by the same actuator.

The feed of the return flow from the coupling heat exchanger during the warm-up phase or in the heating mode for the interior of the motor vehicle is performed in such a way that the temperature detection for the engine temperature regulation is not influenced. The return flow of the coupling heat exchanger takes place preferably downstream from the thermostatic valve. The additional switching valve provided, if necessary, in the return flow of the coupling heat exchanger may be omitted for simplification if the acceleration of the warm-up phase is omitted. In this case, the return flow of the coupling heat exchanger may be connected directly to the radiator inlet. For reducing the thermal stress, the delivery unit should be placed in the relatively cool flow of the coupling heat exchanger.

BRIEF DESCRIPTION OF THE DRAWING

The FIGURE shows the interconnection diagram of the internal combustion engine including a supercharging device, a steam circuit and one cooling circuit and one expanded cooling circuit.

DETAILED DESCRIPTION

The representation in the FIGURE shows in greater detail that an internal combustion engine 10 includes an engine block 12. A cylinder head 14 is located on engine block 12; a starter/generator 16 is flange-mounted on the engine block in the area of the crank shaft which is not shown in the drawing. Within an exhaust system 20, internal combustion engine 10 includes an exhaust gas catalytic converter 18, a heat exchanger 26 being formed in one branch in exhaust system 20. Heat exchanger 26 is part of a circuit 24 for a working medium, the circuit being in particular a steam circuit according to the approach according to the present invention. Apart from heat exchanger 26, circuit 24 includes a device for utilizing waste heat, which includes an expansion machine 28 and a pump 30. Furthermore, the working medium flows through a coupling heat exchanger 40, i.e., a condenser, within circuit 24, i.e., the steam in steam circuit 24. The working medium of circuit 24, i.e., the steam, is cooled in coupling heat exchanger 40 and dispenses its heat to the cooling medium of the internal combustion engine 10 within heat exchanger 40. On the outlet side, the working medium, i.e., the condensate, exits coupling heat exchanger 40 and flows to pump 30 of the device for utilizing waste heat. In addition to pump 30, a generator 36, via which a battery 38 may be charged, is driven via expansion machine 28 of the device for utilizing waste heat. Between generator 36 and battery 38, a connecting line 86 branches off via which starter 16, which may be operated in generator mode, is connected to a voltage source.

The FIGURE furthermore shows that expansion machine 28 of device for utilizing waste heat 28, 30 drives a compression machine 34 which is connected upstream from an air filter 46.

The schematic representation in the FIGURE of the approach according to the present invention furthermore shows that coupling heat exchanger 40 has a feed flow 42 and a return flow 44. On the one hand, the working medium of circuit 24, i.e., the steam within circuit 24, flows through coupling heat exchanger 40, the steam dispensing its heat to the cooling medium, and on the other hand, the cooling medium, which is transported within a coupling heat exchanger circuit 66, flows through coupling heat exchanger 40. For transporting the cooling medium, a delivery unit 64 is used which is preferably designed as a pump and is situated in "cold" feed flow 42 with regard to coupling heat exchanger 40.

The schematic representation according to FIG. 1 shows that internal combustion engine 10 has a radiator 54. In a conventional manner, a generally electrically driven fan 60 is assigned to radiator 54, as is an equalizing reservoir denoted by reference numeral 62 which serves as an expansion chamber for the cooling medium. A radiator inlet of radiator 54 is denoted by reference numeral 56 and a radiator outlet is identified by reference numeral 58. Coupling heat exchanger circuit 66 is connected to radiator outlet 58. From there, coupling heat exchanger 66 extends to delivery unit 64 in feed flow 42. After passing through coupling heat exchanger 40, heated cooling medium flows to a switching valve 52 via return flow 44. Switching valve 52 is in particular a 3-way valve. Depending on the activation of switching valve 52, return flow 44 exiting coupling heat exchanger 40 may on the one hand be fed into radiator 54 downstream from a thermostatic valve 78 upstream from radiator inlet 56 and cooled there; on the other hand—depending on the activation of additional valve 52, preferably designed as a 3-way valve—in such a way that cooling medium heated in coupling heat exchanger 40 is fed in via a feed 68 upstream from a cooling medium pump 74, which is located in first circuit 70 of internal combustion engine 10.

Starting from feed 68, first circuit 70 on internal combustion engine 10 extends to cooling medium pump 74. From there, the cooling medium flows through engine block 12 or cylinder head 14 of internal combustion engine 10. Depending on the switching of a heating valve 84 or of thermostatic valve 80, heated cooling medium 14 exits the internal combustion engine and flows toward thermostatic valve 80. Both thermostatic valve 80 and switching valve 52 are controlled depending on the outlet temperature of cooling medium $\vartheta_{VKM,outlet}$. If the outlet temperature of cooling medium $\vartheta_{VKM,outlet}$ drops below the setpoint temperature during the operation of internal combustion engine 10, switching valve 52 is switched in such a way that the heated cooling medium flows to first circuit 70 of the internal combustion engine via feed 68 and not through radiator 54. The branch of return flow 44, which extends downstream from thermostatic valve 80 and extends to radiator inlet 56 of radiator 54, is in this case closed.

Apart from already-mentioned first circuit 70 of internal combustion engine 10, a heating circuit 72 is also assigned to internal combustion engine 10 following the approach according to the present invention. This heating circuit 72 includes an interior auxiliary heater 76 which is controlled using a heating valve 84 which is also a component of heating circuit 72. Heating valve 84 is also preferably designed as a 3-way valve and opens or closes a bypass 82 which extends parallel to the heat exchanger of auxiliary heater 76 in heating circuit 72. Heating circuit 72 opens into the line of the cooling medium which extends from cooling outlet 58 to cooling medium pump 74.

In an advantageous manner, both switching valve 52 and thermostatic valve 80 are also controlled via a common actuator 78, and both valves 52, 80 are preferably designed in such a way that they are adjusted at the same temperature.

In order not to influence the engine temperature regulation, the return line of return flow 44 of coupling heat exchanger 40, i.e., the condenser, is designed in such a way that the temperature detection for the engine temperature regulation is not influenced. In the case of thermostatic valve 80 normally used as an expansion material thermostat, this takes place in such a way that return flow 44 is fed in downstream from thermostatic valve 80.

Using the approach according to the present invention, the exhaust gas of internal combustion engine 10, which enters exhaust system 20 at outlet 50 of cylinder head 14 via an exhaust gas manifold, which is not shown in the FIGURE, may be cooled within circuit 24, in particular within coupling heat exchanger 40. In this way, the heat present in the exhaust gas of the internal combustion engine is discharged through circuit 24 via the cooling system, i.e., radiator 54, first circuit 70, or heating circuit 72. This makes it possible to dispense with the expense for a separate cooling system. In the case of the approach according to the present invention, a lowest possible temperature level is achieved in coupling heat exchanger 40, resulting in a very high thermal efficiency in circuit 24 of the working medium, preferably steam.

Following the approach according to the present invention, a warm-up phase of internal combustion engine 10 may be shortened and an auxiliary heating operating mode may be implemented, via which, for example, the interior of a motor vehicle may be heated using an interior auxiliary heater 76. These operating modes will be described in greater detail in the following.

During the warm-up phase of the internal combustion engine, the waste heat of circuit 24 is given off in coupling heat exchanger 40 to the cooling medium which circulates in coupling heat exchanger circuit 66. On the one hand, the working medium of circuit 24, i.e., steam, flows through coupling heat exchanger 40 and, on the other hand, the cooling medium of internal combustion engine 10, which is guided via delivery unit 64 in cold feed flow 42 to coupling heat exchanger 40, flows through it. During the warm-up phase of internal combustion engine 10, the connection of return flow 44 via feed 68 into first circuit 70 of internal combustion engine 10 takes place when switching valve 52 is appropriately switched. The heated cooling medium is guided through cooling medium pump 74 into engine block 12 of the internal combustion engine as well as its cylinder head 14, as a result of which the fuel consumption of internal combustion engine 10 is reduced during the warm-up phase. Consequently, the waste heat decoupled from circuit 24 may be utilized for shortening the warm-up phase of internal combustion engine 10. In this case—during the warm-up phase—heating valve 84 remains closed depending on the driver input, so that cooling medium circulates in first circuit 70.

After the warm-up phase of internal combustion engine 10 is concluded, switching valve 52 is activated as a function of the outlet temperature of cooling medium $\vartheta_{VKM,outlet}$ in such a way that return flow 44 of coupling heat exchanger 40 is no longer guided into radiator 54 via feed 68 but is instead fed into it downstream from thermostatic valve 80 upstream from radiator inlet 56 of radiator 54. Accordingly, the cooling medium in coupling heat exchanger 40 flowing via return flow 44 is guided via radiator 54 of internal combustion engine 10 and cooled there. It is thus possible to increase the power in circuit 24, i.e., in the steam circuit.

If engine outlet temperature 19 $\vartheta_{VKM,outlet}$ of internal combustion engine 10 drops below a setpoint temperature during operation, switching valve 52 is again switched back to first circuit 70, so that return flow 44 may be fed into first circuit 70 via feed 68 immediately upstream from cooling medium pump 74. It is thus possible on the one hand to utilize the waste heat of the steam circuit for engine heating, and on the other hand, also in connection with heating circuit 72, for interior heating in the case of a flow through interior auxiliary heater 76. This depends on the position of heating valve 84, which is provided in heating circuit 72. In an advantageous manner, both thermostatic valve 80 and switching valve 52 are controlled as a function of the engine temperature, or alternatively, the outlet temperature of cooling medium $\vartheta_{VKM,outlet}$. In an advantageous embodiment variant, the two valves, i.e., switching valve 52 and thermostatic valve 80, which may be a conventionally used expansion material thermostat, may be adjusted to the same temperature. In another simplified embodiment, switching valve 52 and thermostatic valve 80 may be adjusted by a common actuator 78.

In order not to adversely affect the engine temperature regulation, the feed-in of return flow 44 takes place on the output side of coupling heat exchanger 40 both in the warm-up phase as well as in connection with the auxiliary heating mode in such a way that the temperature detection for the engine temperature regulation is not influenced, in particular in such a way that the feed-in of return flow 44 of coupling heat exchanger 40 takes place downstream from thermostatic valve 80.

If the shortening of the warm-up phase is omitted, switching valve 52 at the end of return flow 44 may be entirely eliminated. In this case, return flow 44 of coupling heat exchanger 40, i.e., of the condenser, is connected directly to radiator inlet 56 of radiator 54, the cooling medium being cooled by fan wheel 60. Furthermore, it may be noted that for reducing the thermal stress, delivery unit 64 is preferably placed in cold feed flow 42 of coupling heat exchanger 40 for circulating the cooling medium in coupling heat exchanger circuit 66.

In an advantageous manner, the lowest available temperature level in any operating mode of internal combustion engine 10 may be used within coupling heat exchanger 40 using the approach according to the present invention.

What is claimed is:

1. A device for utilizing waste heat of an internal combustion engine, comprising:
    a heat exchanger of a circuit of a working medium situated in an exhaust system of the internal combustion engine, the circuit including an expansion machine;
    a pump connected upstream from the heat exchanger; and
    a coupling heat exchanger situated in the circuit of the working medium, the working medium of the circuit and a cooling medium of the internal combustion engine flowing through the coupling heat exchanger;
    wherein at least one flow out of the coupling heat exchanger is selectively fed into a connecting line which is connected to the internal combustion engine in a warm-up phase of the internal combustion engine preceding reaching of a normal operating temperature of the internal combustion engine, and wherein the at least one flow out of the coupling heat exchanger is selectively fed into a radiator inlet of a radiator when the internal combustion engine is operating at the normal operating temperature.

2. The device according to claim 1, wherein the circuit is a steam circuit, whose expansion machine drives the pump and a compression machine in an intake system of the internal combustion engine.

3. The device according to claim 1, wherein at least one flow into the coupling heat exchanger is transmitted from a radiator outlet of the radiator of the internal combustion engine.

4. The device according to claim 1, further comprising a switching valve, wherein the selected at least one flow out of the coupling heat exchanger is connected to the switching valve.

5. The device according to claim 4, wherein the switching valve and a thermostatic valve are controlled as a function of an outlet temperature of the cooling medium of the internal combustion engine and are designed as 3-way valves.

6. The device according to claim 4, wherein the switching valve and a thermostatic valve are controlled via a common actuator.

7. The device according to claim 1, further comprising a delivery pump situated in a feed flow to the coupling heat exchanger.

* * * * *